United States Patent
Fujita et al.

(10) Patent No.: US 8,593,754 B2
(45) Date of Patent: Nov. 26, 2013

(54) MAGNETIC TAPE DRIVING APPARATUS HAVING A HEAD DISPLACING PORTION

(75) Inventors: Masao Fujita, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 199 days.

(21) Appl. No.: 13/115,163

(22) Filed: May 25, 2011

(65) Prior Publication Data
US 2011/0292539 A1    Dec. 1, 2011

(30) Foreign Application Priority Data

May 26, 2010   (JP) .................................. 2010-120171

(51) Int. Cl.
   *G11B 21/02*   (2006.01)
(52) U.S. Cl.
   USPC .......................................................... 360/75
(58) Field of Classification Search
   None
   See application file for complete search history.

(56) References Cited

U.S. PATENT DOCUMENTS

| | | |
|---|---|---|
| 4,414,593 A | 11/1983 | Miller et al. |
| 5,923,494 A | 7/1999 | Arisaka et al. |
| 7,391,585 B1 | 6/2008 | Bayang et al. |
| 2008/0253017 A1 | 10/2008 | Kitahara |
| 2008/0259490 A1 | 10/2008 | Fujita et al. |
| 2008/0278844 A1 | 11/2008 | Kawakami et al. |
| 2010/0002338 A1 | 1/2010 | Kawakami et al. |

FOREIGN PATENT DOCUMENTS

| | | |
|---|---|---|
| JP | S56-35162 | 4/1981 |
| JP | 7-201029 A | 8/1995 |
| JP | 2006-127666 A | 5/2006 |
| JP | 4139428 B1 | 8/2008 |
| JP | 2008-262645 A | 10/2008 |
| JP | 2008-287850 A | 11/2008 |

OTHER PUBLICATIONS

United Kingdom Search Report dated Aug. 30, 2011, for United Kingdom Application No. GB1108765.7.
The Office Action, mailed on Jul. 16, 2013, issued in corresponding Japanese Patent Application No. 2009-277316.

*Primary Examiner* — Paul Huber (57) ABSTRACT

A magnetic tape driving apparatus, which does not cause damage to either a magnetic head or a magnetic tape when making transition of the magnetic tape from a stopped state to a running state, when making transition of the magnetic tape from a running state to a stopped state, or when reversing the transportation direction of the magnetic tape, is provided. In a state where any one of a magnetic head and a magnetic tape moves and the other rests (i.e., a state where static friction may occur), such as at the time of starting transportation of the magnetic tape, at the time of stopping the tape in a running state, and at the time of reversing the transportation direction of the magnetic tape, a head displacing portion vibrates the magnetic head under the control by a displacement control portion, and thus no static friction occurs between the magnetic head and the magnetic tape. Therefore, the risk of causing damage to the magnetic head (such as an MR head unit equipped with an MR element) or the magnetic tape can be reduced.

5 Claims, 5 Drawing Sheets

MAGNETIC TAPE DRIVING APPARATUS HAVING A HEAD DISPLACING PORTION

BACKGROUND

1. Field

The present application relates to a magnetic tape driving apparatus capable of driving a magnetic tape, and a magnetic tape driving method. In particular, the present application is useful for a magnetic tape apparatus that uses a magnetic sensor head to linearly record data on a magnetic tape with a surface smoothness Ra of 3.0 nm or less.

2. Description of Related Art

A magnetic tape is a kind of magnetic recording medium and for various applications such as an audio tape, a video tape, and a computer tape. Particularly, in the field of backup tapes for computers, tapes with a storage capacity of hundreds of gigabytes per volume have been commercialized along with an increase in capacity of a hard disk to be backed up. In the future, backup tapes with a larger capacity are essential to deal with a further increase in capacity of the hard disk.

For a magnetic tape used as a backup tape, the recording wavelength becomes shorter as the recording capacity increases further, and the surface smoothness has been improved to suppress the degradation of recording/reproducing characteristics due to spacing. When the surface of the magnetic tape is smoothed, the contact area between the magnetic tape and a magnetic head is increased, thus increasing friction between them. Particularly, static friction occurs, e.g., at the time the magnetic tape that is in contact with the magnetic head starts running. If this static friction is increased, the magnetic tape and the magnetic head may be damaged. In order to address such static friction between the magnetic head and the magnetic tape, e.g., JP 2006-127666 A and JP 2008-262645 A disclose the following technology.

In JP 2006-127666 A, small recesses are formed in a BOT (beginning of tape) portion and an EOT (end of tape) portion so as to reduce static friction between the magnetic tape and the magnetic head during magnetic recording and reproduction. With this configuration, even if the magnetic tape starts running while the magnetic head is positioned at the BOT portion or the EOT portion, tape damage can be suppressed because of reduced static friction.

JP 2008-262645 A discloses a recording and playback device that includes a speed detector for detecting a running speed of a magnetic tape, a rocking apparatus for vibrating a magnetic head, and a controller for making the magnetic head vibrate by the rocking apparatus when the running speed of the magnetic tape is decided to be lower than a predetermined value, while making an operation of the rocking apparatus stop when the running speed is decided to be at least the predetermined value. With this configuration, static friction between the magnetic head and the magnetic tape is suppressed.

However, in the configuration of JP 2006-127666 A, the recesses are formed only in the BOT portion and EOT portion of the magnetic tape. Therefore, when the start and stop motions of the magnetic tape are repeated with the magnetic head being in contact with the portion (in which no recess is formed) between the BOT and EOT portions, the magnetic head or the magnetic tape are damaged by the static friction between them.

In the configuration of JP 2008-262645 A, a speed detector for detecting the speed of the magnetic tape and in particular, a rocking apparatus as a component essential for the configuration are required, resulting in a problem that the device is upsized and the cost for producing the device is increased.

It is an object of the present application to provide a magnetic tape driving apparatus that does not suffer from damage to a magnetic head and a magnetic tape when the magnetic tape makes a transition from the stopped state to the running state and vice versa or reverses in the running direction of the magnetic tape, and that can prevent damage to the magnetic tape and the magnetic head.

SUMMARY

A magnetic tape driving apparatus disclosed in the present application is a magnetic tape driving apparatus that includes: a magnetic head unit comprising a magnetic head capable of recording or reproducing information by sliding to contact with a magnetic tape; and a tape transporting portion for transporting the magnetic tape. The magnetic tape driving apparatus further includes a head displacing portion for displacing the magnetic head unit in the width direction of the magnetic tape and tracking the magnetic head to an arbitrary track among a plurality of tracks formed on the magnetic tape. And when the tape transporting portion starts transportation of the magnetic tape in a stopped state and/or when the tape transporting portion stops the magnetic tape in a running state, the head displacing portion vibrates the magnetic head unit in the tape width direction.

A method of driving a magnetic tape disclosed in the present application includes: vibrating a magnetic head unit in the width direction of a magnetic tape, following an input of instruction for starting transportation of the magnetic tape; starting transportation of the magnetic tape after the magnetic head unit starts vibrating in the tape width direction; and stopping the vibration of the magnetic head unit after the magnetic tape starts running.

A method of driving a magnetic tape disclosed in the present application includes: vibrating a magnetic head unit in the width direction of a magnetic tape, following an input of instruction for stopping transportation of the magnetic tape in a state where the magnetic tape is running; stopping transportation of the magnetic tape after the magnetic head unit starts vibration; and stopping vibration of the magnetic head unit after the magnetic tape stops running.

A method of driving a magnetic tape disclosed in the present application includes: vibrating a magnetic head unit in the width direction of a magnetic tape, following an input of instruction for reversing a transportation direction of the magnetic tape in a state where the magnetic tape is running in a first direction; stopping transportation of the magnetic tape after the magnetic head unit starts vibration; starting transportation of the magnetic tape in a second direction different from the first direction after the magnetic tape stops running; and stopping vibration of the magnetic head unit after the magnetic tape starts running in the second direction.

DETAILED DESCRIPTION OF THE INVENTION

In the magnetic tape driving apparatus disclosed in the present application, it is preferable that when the magnetic tape transporting portion reverses the transportation direction of the magnetic tape, the head displacing portion vibrates the magnetic head unit in the tape width direction from a moment before stopping the magnetic tape running in a first direction to a moment after starting transportation of the tape in a second direction different from the first direction. According to the configuration, the static friction between the magnetic tape and the magnetic head can be decreased at the time of reversing the transportation direction of the magnetic tape. As a result, a phenomenon such as sticking of the magnetic tape to the magnetic head can be reduced, and damage to the magnetic tape and/or the magnetic head can be prevented.

In the magnetic tape driving apparatus disclosed in the present application, the head displacing portion is configured to be capable of displacing the magnetic head unit in the width direction of the magnetic tape at the time of tracking the magnetic head to an arbitrary track among a plurality of tracks formed on the magnetic tape. Due to the configuration, the head displacing portion can serve as a member for vibrating the magnetic head unit and also as a member for moving the magnetic head in the width direction of the magnetic tape at the time of performing the tracking servo, and thus both the cost and the size can be reduced.

EMBODIMENTS

1. Structure of Magnetic Tape Driving Apparatus

Figure 1:
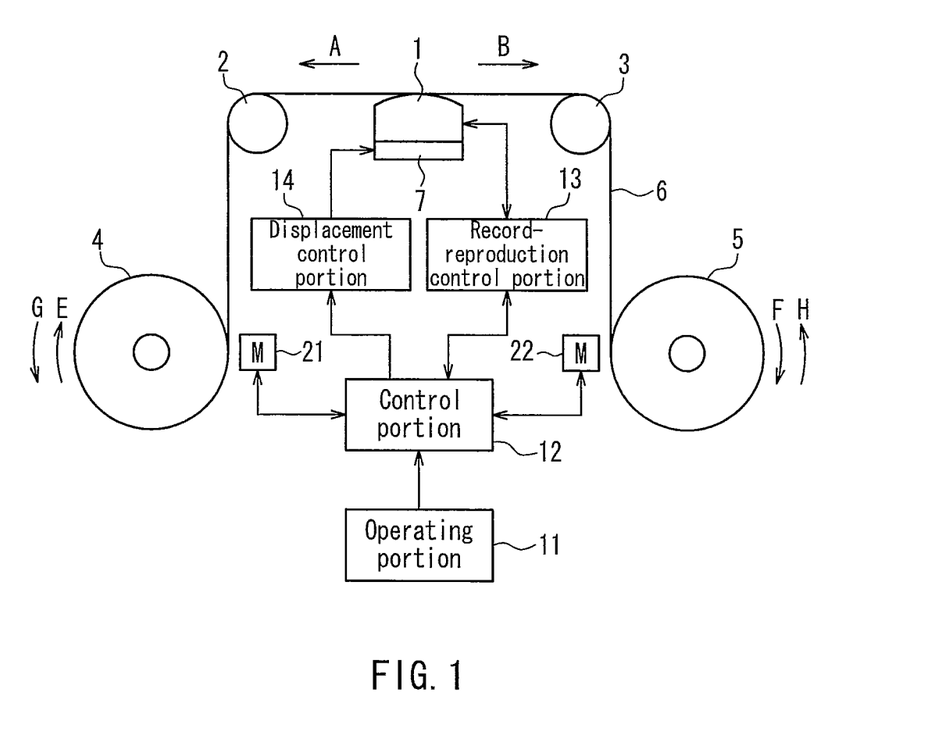
FIG. 1 is a block diagram showing a configuration of a magnetic tape driving apparatus of an embodiment.
Figure 2:
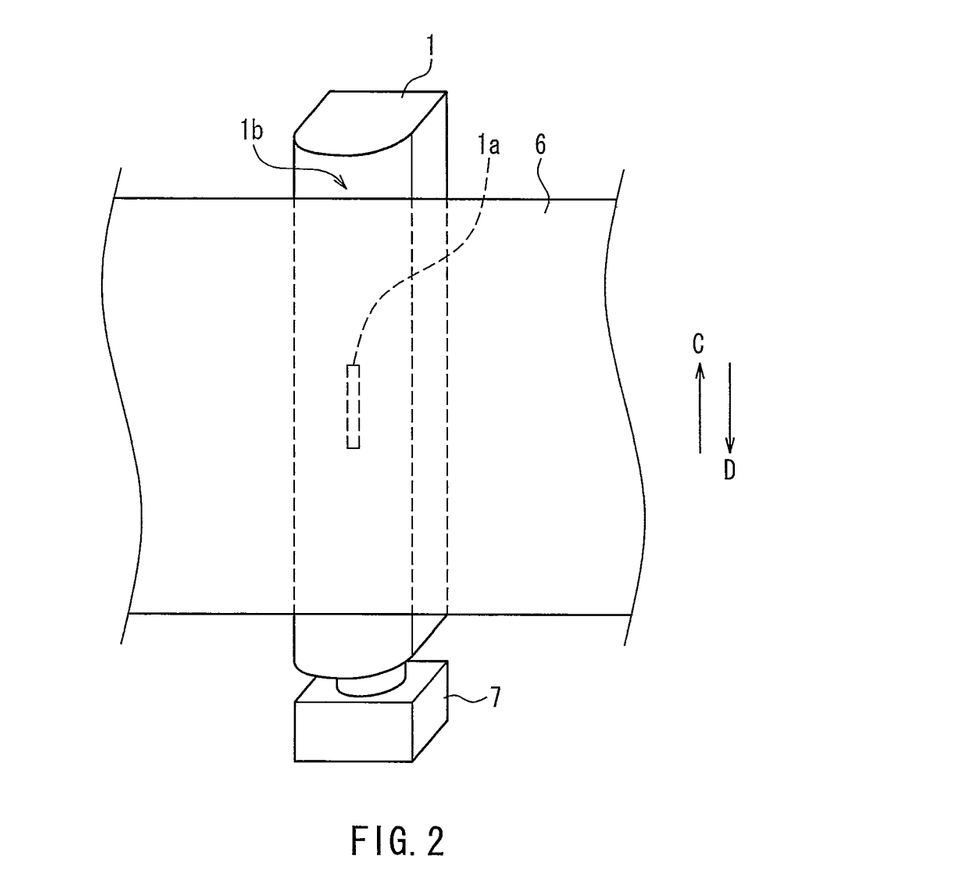
FIG. 2 is a perspective view showing specific structures of a magnetic head and a head displacing portion.

FIG. 1 is a block diagram showing a magnetic tape driving apparatus according to the present embodiment. FIG. 2 is a perspective view showing specific structures of a magnetic head 1 and a head displacing portion 7. The magnetic tape driving apparatus according to the present embodiment is an apparatus capable of linear recording of data with respect to a computer tape. Further, the magnetic tape driving apparatus according to the present embodiment is useful for a magnetic tape apparatus that uses a magnetic sensor head to linearly record data on a magnetic tape with a surface smoothness Ra of 3.0 nm or less.

As shown in FIG. 1, the magnetic tape driving apparatus according to the present embodiment includes the magnetic head 1, tape guide members 2 and 3, a first reel 4, the head displacing portion 7, an operating portion 11, a control portion 12, a record-reproduction control portion 13, a displacement control portion 14, motors 21 and 22. A second reel 5 and a magnetic tape 6 can be attached detachably to the magnetic tape driving apparatus.

The magnetic head 1 can record various information on the magnetic tape 6 and reproduce various information recorded on the magnetic tape 6. In the magnetic head 1, in a state where the magnetic tape 6 is loaded at a predetermined position inside the apparatus, a sliding surface 1b (see FIG. 2) on which an MR head unit 1a (see FIG. 2) equipped with an MR element is placed is in contact with the magnetic tape 6. It should be noted that the magnetic head 1 is not limited to the MR head equipped with MR (magneto-resistive effect) element in the present embodiment.

The tape guide members 2 and 3 are placed respectively on the first reel 4 side and the second reel 5 side of the magnetic head 1. The tape guide members 2 and 3 regulate the winding angle of the magnetic tape 6 to the magnetic head 1 and also the position of the magnetic tape 6 in the width direction.

The first reel 4 is capable of winding the magnetic tape 6 unwounded from the second reel 5 (below-mentioned). The first reel 4 is placed in advance in the magnetic tape driving apparatus. The first reel 4 is driven to rotate in the direction indicated with an arrow E or G by a motor 21 that is driven by the control portion 12.

The second reel 5 is placed in a cartridge (not shown) that can be attached detachably to the magnetic tape driving apparatus. When the cartridge (not shown) is inserted into the magnetic tape driving apparatus, the second reel 5 is put on a reel table (not shown) of the apparatus. The reel table is rotated in the direction indicated with an arrow F or H by a motor 22 that is driven by the control portion 12. Since the first reel 4 rotates in the direction indicated with the arrow E and the second reel 5 rotates in the direction indicated with the arrow F, the magnetic tape 6 can be transported in a direction indicated with an arrow A (first direction or forward direction). Or, since the first reel 4 also rotates in the direction indicated with the arrow G and the second reel 5 also rotates in the direction indicated with the arrow H, the magnetic tape 6 can be transported in a direction indicated with an arrow B (second direction or reverse direction).

The magnetic tape 6 is a magnetic tape for data recording. The magnetic tape 6 unwounded from the second reel 5 gets contact with the tape guide member 3, the magnetic head 1 and the tape guide member 2 in this order, and is wound around the first reel 4. In the present embodiment, the magnetic tape 6 is provided as a magnetic tape in conformity with the LTO (Linear Tape Open) standards, but the present application is not limited to this example.

In the present embodiment, the head displacing portion 7 is provided as a voice coil motor, but the present application is not limited to this example. The head displacing portion 7 can displace the magnetic head 1 in a direction indicated with an arrow C or D (the width direction of the magnetic tape 6) as shown in FIG. 2, under the control by the displacement control portion 14. Specifically, in the present embodiment, the head displacing portion 7 has a tracking mode for displacing the magnetic head 1 in the width direction of the magnetic tape 6 in order to perform a tracking servo and a vibration mode for displacing the magnetic head 1 in a short cycle in the width direction of the magnetic tape 6.

Namely, the magnetic tape driving apparatus of the present embodiment is an apparatus for recording data on the magnetic tape 6 in a format in conformity with the LTO standards. Therefore, the magnetic head 1 can be displaced in the width direction of the magnetic tape 6 for the purpose of forming a plurality of tracks parallel to the width direction of the magnetic tape 6 at the time of data recording and for the purpose of tracing selectively a plurality of tracks formed in the width direction of the magnetic tape 6 at the time of data reproduction (tracking mode). Namely, by shortening the cycle of the driving current applied to the voice coil for performing the tracking, the magnetic head 1 can be displaced continuously in a short cycle in the width direction of the magnetic tape 6 (vibration mode). In the present embodiment, the displacement in a short cycle of the magnetic head 1 will be called "vibration". Since the tracking operation of the magnetic head 1 with respect to the magnetic tape 6 is disclosed by for example Japanese patent No. 4139428, it is not explained in detail in the present Specification.

The operating portion 11 receives various operations in the form of a recording instruction and stopping instruction from a user. When receiving the various operations from the user, the operating portion 11 sends control signals to the control portion 12.

When the control signal is sent from the operating portion 11, the control portion 12 controls the record-reproduction control portion 13, the displacement control portion 14 and the motor 21 and 22, in accordance with the content of the control signal. Specifically, the control portion 12 outputs to the record-reproduction control portion 13 an instruction signal for recording information on the magnetic tape 6 and an instruction signal for reading out information recorded on the magnetic tape 6. The control portion 12 sends to the displacement control portion 14 an instruction for starting or stopping vibration of the head displacement portion 7. The control portion 12 sends to the motors 21 and 22 an instruction for starting or stopping the motions.

The record-reproduction control portion 13 operates the magnetic head 1 to record or reproduce in accordance with the control command from the control portion 12. Specifically the record-reproduction control portion 13 controls feeding the magnetic head 1 with a predetermined electric current so as to generate a magnetic field in the magnetic head 1 in the vicinity of the portion to slide-contact with the magnetic tape 6.

The displacement control portion 14 sends to the head displacing portion 7 an instruction for displacing the magnetic head 1 in the width direction of the magnetic tape 6. Specifically, when the head displacing portion 7 is for example provided as a voice coil motor, the displacement control portion 14 applies a driving current to the voice coil. At this time, by controlling the driving current to be applied to the voice coil, the head displacing portion 7 can be operated at a frequency (cycle) corresponding to either the tracking mode or the vibration mode.

Here, it is preferable that the vibration frequency of the head displacing portion 7 in the vibration mode is not less than 10 Hz and less than 1 kHz for suppressing the static friction between the magnetic head 1 and the magnetic tape 6. In a case where the vibration frequency of the head displacing portion 7 in the vibration mode is less than 10 Hz, when the magnetic head is vibrated, the magnetic tape 6 may vibrate following the vibration of the magnetic head 1 and thus the static friction cannot be suppressed sufficiently. In a case where the vibration frequency of the head displacing portion 7 in the vibration mode is 1 kHz or more, it will be difficult to vibrate the magnetic head with the voice coil. Namely, in a case of a voice coil to be packaged in a typical LTO drive, it will be difficult to vibrate the magnetic head (weight: about 15 grams) to be packaged in the LTO drive at a frequency of 1 kHz or more since the frequency characteristic depends on the electric current flowing in the voice coil and the cross sectional area of the voice coil, and the number of turns. It is possible to achieve the object of the present embodiment "suppressing static friction between the magnetic head 1 and the magnetic tape 6" by vibrating the magnetic head at a frequency of 1 kHz or more if the current to flow, the cross sectional area and the turn numbers for the voice coil to be packaged are modified to correspond to such a high frequency. In that case however, the cost for the entire apparatus will be increased.

Here, it is preferable that the head travel distance (amplitude) to be provided to the magnetic head 1 is in general not less than 0.1 μm and less than 200 μm, though it varies depending on the type and model of the magnetic tape driving apparatus. When the head travel distance (amplitude) is less than 0.1 μm, the amplitude may be too small to suppress sufficiently the static friction. When the head travel distance (amplitude) is 200 μm or more, the vibration in the width direction of the magnetic tape is increased to cause collision of an edge of the magnetic tape 6 to regulating portions (brim-shaped member provided to the tape guide members 2 and 3 for the purpose of regulating displacement in the width direction of the magnetic tape) of the tape guide members 2 and 3, resulting in damage to the edge. Therefore, it is preferable that the head travel distance (amplitude) for the magnetic head 1 as in the present embodiment is not less than 0.1 μm and less than 200 μm.

2. Operation of Magnetic Tape Driving Apparatus

Figure 3A:
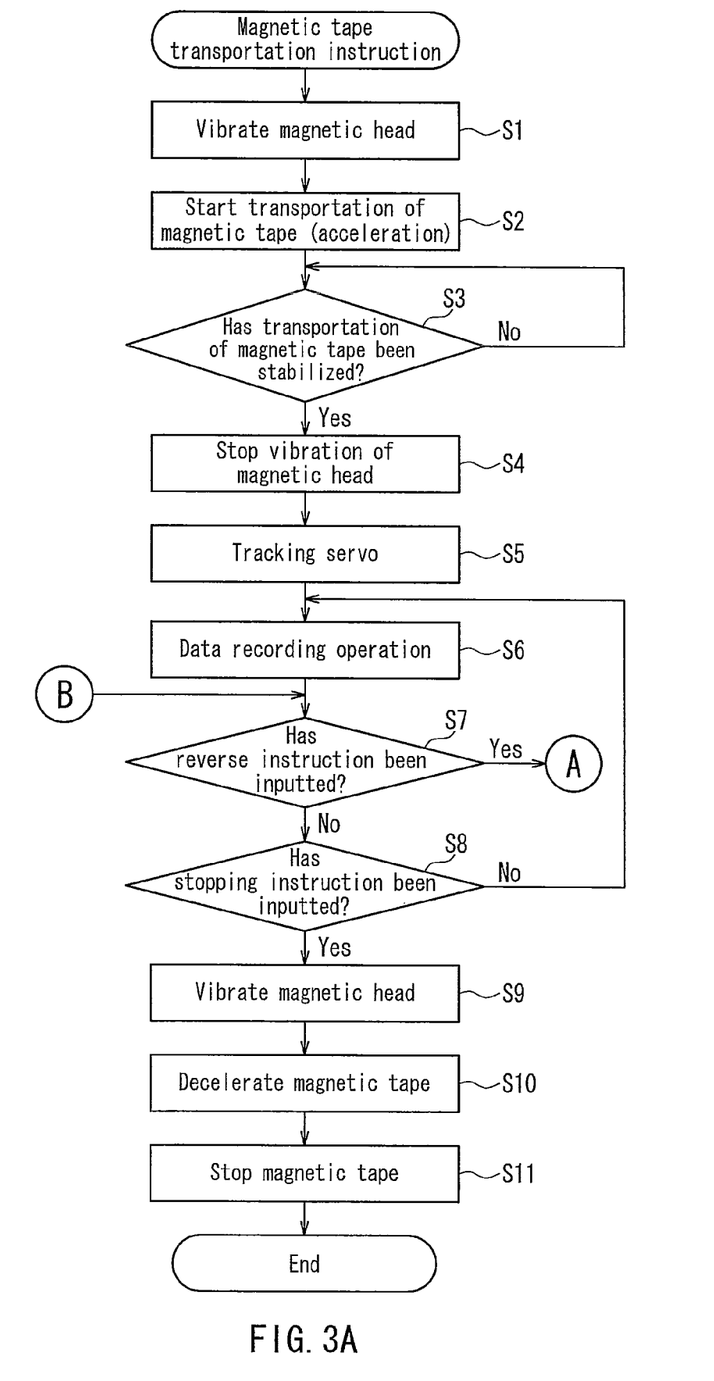
FIG. 3A is a flow chart showing recording operations of a magnetic tape driving apparatus.
Figure 3B:
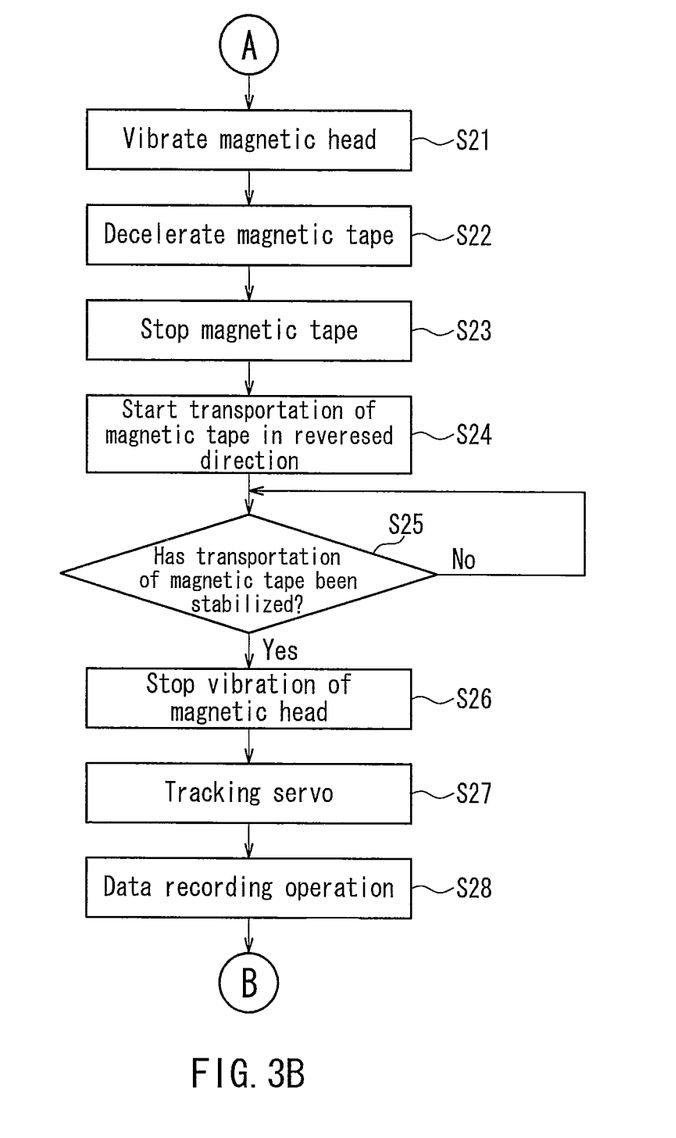
FIG. 3B is a flow chart showing reverse operations of a magnetic tape driving apparatus.
Figure 4A:
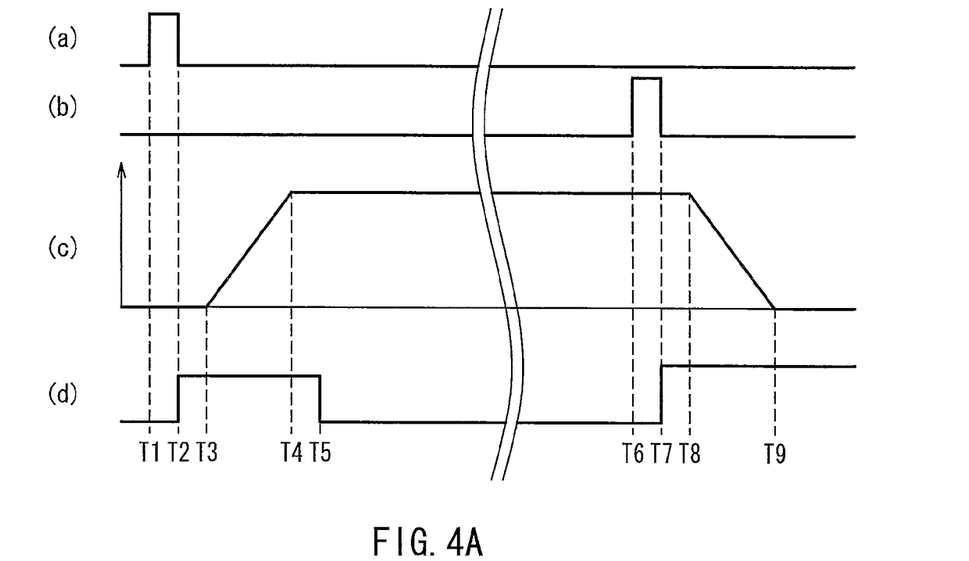
FIG. 4A is a timing chart showing recording operations of a magnetic tape driving apparatus.
Figure 4B:
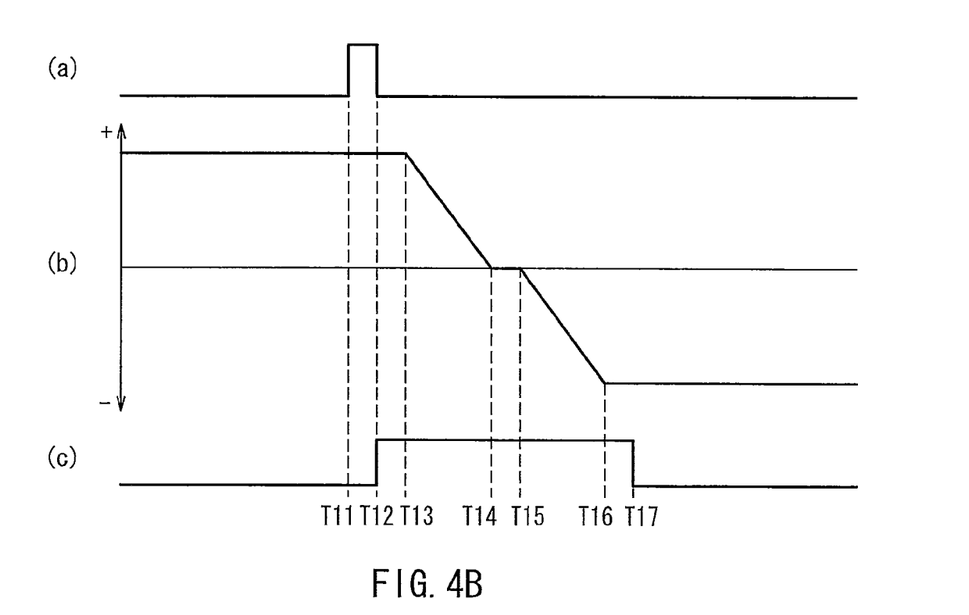
FIG. 4B is a timing chart showing reverse operations of a magnetic tape driving apparatus.

FIG. 3A is a flow chart showing operations at the time of recording information on the magnetic tape 6. FIG. 3B is a flow chart showing operations at the time of reversing the transportation direction of the magnetic tape 6 from the direction indicated with the arrow A to the direction indicated with the arrow B. In FIG. 4A, (a) denotes a record-starting instruction, (b) denotes a record-stopping instruction, (c) denotes a transportation speed of the magnetic tape 6, and (d) denotes an operation at the head displacing portion 7, at the time of recording information on the magnetic tape 6. In FIG. 4B, (a) denotes a reverse instruction, (b) denotes a transportation speed of the magnetic tape 6, and (c) denotes operations at the head displacing portion 7, at the time of reversing the transportation direction of the magnetic tape 6 from the direction indicated with the arrow A to the direction indicated with the arrow B. In FIG. 4B(b), the (+) positive definite of the transportation speed indicates the transportation speed at the time of transporting the magnetic tape 6 in the direction indicated with the arrow A, and the (−) negative definite of the transportation speed indicates the transportation speed at the time of transporting the magnetic tape 6 in the direction indicated with the arrow B. The High Periods in FIG. 4A(d) and FIG. 4B(c) denote the periods during which the head displacing portion 7 vibrates the magnetic head 1.

2-1. Recording Operation

First, as shown in FIG. 1, in a state where loading of the magnetic tape 6 has completed, the magnetic tape 6 stops in a state being in contact with the sliding surface 1b (see FIG. 2) of the magnetic head 1. Here, the operation for loading the magnetic tape 6 is not explained in detail since the operation is well-known. At this time, since the displacement control portion 14 does not provide an operation instruction to the head displacing portion 7, the magnetic head 1 does not vibrate.

In this state, when the operating portion 11 is operated by a user so that a record-starting instruction is inputted (timing T1 in FIG. 4A), the control portion 12 outputs to the displacement control portion 14 an instruction for operating the head displacing portion 7. Based on the inputted operating instruction, the displacement control portion 14 applies a driving current to the head displacing portion 7. Based on the driving current applied from the displacement control portion 14, the head displacing portion 7 vibrates the magnetic head 1 in the directions indicated with arrows C and D (see FIG. 2) at a vibration frequency of 10 Hz (Step S1 in FIG. 3A, timing T2 in FIG. 4A).

The displacement control portion 14 continues to output the driving current to the head displacing portion 7 until the transportation speed of the magnetic tape 6 is stabilized (Step S3 as mentioned below).

Next, the control portion 12 sends to the motor 21 an instruction for rotating a first reel 4 in a direction indicated with the arrow E, and sends to the motor 22 an instruction for rotating a second reel 5 in a direction indicated with the arrow F. Thereby the motors 21 and 22 start driving respectively to rotate the first reel 4 and the second reel 5. When the first reel 4 rotates in the direction indicated with the arrow E and the second reel 5 starts rotating in the direction indicated with the arrow F, the magnetic tape 6 starts running in the direction indicated with the arrow A (Step S2 in FIG. 3A, timing T3 in FIG. 4A). Here, as shown in FIG. 4A, at the time the magnetic tape 6 starts running (timing T3), since the magnetic head 1 is vibrated by the head displacing portion 7, no static friction occurs between the magnetic head 6 and the magnetic tape 1.

Next, the control portion 12 controls the motors 21 and 22 so as to increase gradually the transportation speed of the magnetic tape 6, and then transports the magnetic tape 6 at a predetermined constant transportation speed. Specifically, the control portion 12 detects the torque currents of the motors 21 and 22 so as to calculate the transportation speed of the magnetic tape 6 while controlling the motors 21 and 22 so as to accelerating gradually the transportation of the magnetic tape 6. This process of calculating the transportation speed is executed at predetermined time intervals. The control portion 12 stores data of the calculated transportation speed, and when detecting that the variation of the transportation speed becomes smaller than a predetermined value, decides that the transportation speed of the magnetic tape 6 is stabilized (YES decision in step S3 in FIG. 3A, timing T4 in FIG. 4A).

Next, when deciding that the transportation speed has been stabilized, the control portion 12 sends to the displacement control portion 14 an instruction for stopping the vibration operation. When the instruction for stopping the vibration operation is sent from the control portion 12, the displacement control portion 14 stops outputting the driving current to the head displacing portion 7. When the application of driving current from the displacement control portion 14 stops, the head displacing portion 7 stops the vibration (step S4 in FIG. 3A, timing T5 in FIG. 4A).

Next, the control portion 12 outputs to the displacement control portion 14 an instruction for performing a tracking servo. Based on the inputted instruction, the displacement control portion 14 controls the head displacing portion 7 so as to move the magnetic head 1 in the width direction of the magnetic tape 6, so that the data head in the magnetic head 1 will track a predetermined track. Regarding the detailed configuration of the magnetic head 1 and the tracking servo operations, for example the configuration of the magnetic head and the operations of the tracking servo as disclosed in JP 4139428 can be referred to (step S5 in FIG. 3A).

Next, the control portion 12 outputs to the record-reproduction control portion 13 an instruction for recording data. Based on the inputted instruction, the record-reproduction control portion 13 controls the magnetic head 1 to record data on the data track of the magnetic tape 6. Thereby, data are recorded on the magnetic tape 6 by the magnetic head 1 (step S6 in FIG. 3A).

Next, during recording data on the magnetic tape 6, if the operating portion 11 is operated by the user and a reverse instruction is inputted, the control portion 12 controls the respective portions so as to change the transportation direction of the magnetic tape 6. The reverse control will be explained in detail later (step S7 in FIG. 3A).

Next, during recording data on the magnetic tape 6, if the operating portion 11 is operated by the user and a stopping instruction is inputted (YES decision in step S8 in FIG. 3A, timing T6 in FIG. 4A), the control portion 12 sends a vibration starting instruction to the displacement control portion 14. When the vibration starting instruction is sent from the control portion 12, the displacement control portion 14 applies a driving current to the head displacing portion 7. Based on the driving current applied from the displacement control portion 14, the head displacing portion 7 vibrates the magnetic head 1 in the directions indicated with the arrows C and D (see FIG. 2) at a vibration frequency of 10 Hz (step S9 in FIG. 3A, timing T7 in FIG. 4A).

The displacement control portion 14 continues to output the driving current to the head displacing portion 7 until the magnetic tape 6 stops (step S11 as mentioned below).

Next, the control portion 12 outputs a stopping instruction to the motors 21 and 22 (timing T8 in FIG. 4A). Thereby, the motors 21 and 22 decelerate to gradually decrease the number of rotations of the first reel 4 and the second reel 5 so as to lower the transportation speed of the magnetic tape 6 (step S10 in FIG. 3A). After a while, the magnetic tape 6 stops running (step S11 in FIG. 3A, timing T9 in FIG. 4A). As shown in (d) of FIG. 4A, since the displacement control portion 14 continuously applies a driving current to the head displacing portion 7 by the time the instruction of stopping the magnetic tape 6 is inputted, the magnetic head 1 continues to vibrate from the timing T7 to a timing past the timing T9 (timing to stop the magnetic tape 6). In other words, at the timing T9 at which the magnetic tape 6 stops, occurrence of static friction between the magnetic head 1 and the magnetic tape 6 is prevented.

It is preferable that the displacement control portion 14 continues to apply a driving current to the head displacing portion 7 so as to vibrate continuously the magnetic head 1 unless the power source of the magnetic tape driving apparatus is turned OFF after the timing T9. Thereby, in a case where a record starting instruction is inputted again in the operating portion 11 after the timing T9 and transportation of the magnetic tape 6 is started, occurrence of static friction between the magnetic head 1 and the magnetic tape 6 can be prevented at the timing for starting transportation of the magnetic tape 6 (for example, timing T3).

Although the above explanation is made based on the operations at the time of recording data on the magnetic tape 6, the same explanation can be applied also to the operations for reproducing data recorded on the magnetic tape 6.

2-2. Operation for Reversing Magnetic Tape Transportation Direction

When the operating portion 11 is operated by the user so as to input a reverse instruction (YES decision in step S7 in FIG. 3A) during transportation of the magnetic tape 6 in a direction indicated with either the arrows A or B, the control portion 12 starts control in accordance with the flow as shown in FIG. 3B and the timing chart as shown in FIG. 4B.

First, when the reverse instruction is sent from the operating portion 11 (timing T11 in FIG. 4B), the control portion 12 outputs to the displacement control portion 14 an instruction for operating the head displacing portion 7. Based on the inputted operation instruction, the displacement control portion 14 applies a driving current to the head displacing portion 7. Based on the driving current applied from the displacement control portion 14, the head displacing portion 7 vibrates the magnetic head 1 in the directions indicated with the arrows C and D (see FIG. 2) at a vibration frequency of 10 Hz (step S21 in FIG. 3B, timing T12 in FIG. 4B).

Next, the control portion 12 outputs a stopping instruction to the motors 21 and 22 (timing T13 in FIG. 4B). Thereby, the motors 21 and 22 decelerate to gradually decrease the number of rotations of the first reel 4 and the second reel 5 so as to lower the transportation speed of the magnetic tape 6 (step S22 in FIG. 3B). After a while, the magnetic tape 6 stops running (step S23 in FIG. 3B, timing T14 in FIG. 4B).

Next, when detecting that the transportation of the magnetic tape 6 is stopped on the basis of the torque currents or the like of the motors 21 and 22, the control portion 12 outputs to the motors 21 and 22 an instruction for reversing the rotational direction of the motors 21 and 22 (transportation direction of the magnetic tape 6). When the reverse instruction is sent from the control portion 12, the motors 21 and 22 rotate the first reel 4 in the direction indicated with the arrow G (see FIG. 1) and rotate the second reel 5 in the direction indicated with the arrow H. Thereby, the magnetic tape 6 is transported in the direction indicated with the arrow B (step S24 in FIG. 3B, timing T15 in FIG. 4B).

The control portion 12 executes the control of reversing the transportation direction of the magnetic tape 6 between the timing T14 and the timing T15 in FIG. 4B.

The displacement control portion 14 continues to apply the driving current to the head displacing portion 7 during the control of reversing the transportation direction of the magnetic tape 6 (during the period of a series of operations of deceleration, stopping, reversing the transportation direction, and acceleration). Therefore, the magnetic head 1 continues to vibrate during the control of reversing the transportation direction of the magnetic tape 6, and thus static friction between the magnetic head 1 and the magnetic tape 6 does not occur.

Next, the control portion 12 controls the motors 21 and 22 so as to increase gradually the transportation speed of the magnetic tape 6, and then transports the magnetic tape 6 at a predetermined constant transportation speed. Specifically, the control portion 12 detects the torque currents of the motors 21 and 22 so as to calculate the transportation speed of the magnetic tape 6 while controlling the motors 21 and 22 so as to accelerating gradually the transportation of the magnetic tape 6. This process of calculating the transportation speed is executed at predetermined time intervals. The control portion 12 stores data of the calculated transportation speed, and when detecting that the variation of the transportation speed becomes smaller than a predetermined value, decides that the transportation speed of the magnetic tape 6 is stabilized (YES decision in step S25 in FIG. 3B, timing T16 in FIG. 4B).

Next, when deciding that the transportation speed has been stabilized, the control portion 12 sends to the displacement control portion 14 an instruction for stopping the vibration operation. When the instruction for stopping the vibration operation is sent from the control portion 12, the displacement control portion 14 stops outputting the driving current to the head displacing portion 7. When the application of driving current from the displacement control portion 14 stops, the head displacing portion 7 stops the vibration (step S26 in FIG. 3B, timing T17 in FIG. 4B).

Next, the control portion 12 outputs to the displacement control portion 14 an instruction for performing a tracking servo. Based on the inputted instruction, the displacement control portion 14 controls the head displacing portion 7 so as to move the magnetic head 1 in the width direction of the magnetic tape 6, so that the data head in the magnetic head 1 will track a predetermined track. Regarding the detailed configuration of the magnetic head 1 and the tracking servo operations, for example the configuration of the magnetic head and the operations of the tracking servo as disclosed in JP 4139428 can be referred to (step S27 in FIG. 3B).

Next, the control portion 12 outputs to the record-reproduction control portion 13 an instruction for recording data. Based on the inputted instruction, the record-reproduction control portion 13 controls the magnetic head 1 to record data on the data track of the magnetic tape 6. Thereby, data are recorded on the magnetic tape 6 by the magnetic head 1 (step S28 in FIG. 3B).

The subsequent flow returns to the encircled 'B' in FIG. 3A.

The present embodiment refers to a case where an instruction for reversing the transportation direction is inputted at the operating portion 11. The present embodiment can be applied also to a case of automatically reversing the transportation direction of the magnetic tape 6 at the BOT portion or the EOT portion in the longitudinal direction of the magnetic tape 6 at the time of recording data on the magnetic tape 6 or reproducing data from the magnetic tape 6. Namely, during recording data on the magnetic tape in the format in conformity with the LTO standards, when the magnetic head reaches the edge (BOT portion or EOT portion) in the longitudinal direction of the magnetic tape, transportation of the magnetic tape is stopped and the magnetic head is moved in the width direction of the magnetic tape. Next, the transportation direction of the magnetic tape is reversed and transportation is started, and data are recorded on the magnetic tape with the magnetic head. In this manner, at the time of automatically reversing the transportation direction of the magnetic tape at the BOT portion or the EOT portion in the longitudinal direction of the magnetic tape, the magnetic head is vibrated from a moment just before stopping the magnetic tape to a moment after starting the transportation of the magnetic tape in the opposite direction, thereby the magnetic tape and/or the magnetic head can be prevented from damages.

3. Effect of the Present Embodiment, and the Like

According to the present embodiment, the magnetic head 1 is configured to vibrate at the timing where static friction can occur between the magnetic head 1 and the magnetic tape 6, thereby preventing occurrence of static friction between the magnetic head 1 and the magnetic tape 6, so the risk of damage on the magnetic head 1 or the magnetic tape 6 can be decreased. Namely, in a state where any one of the magnetic head 1 and the magnetic tape 6 moves and the other rests (a state where static friction may occur), for example, at the time of starting transportation of the magnetic tape 6, stopping the magnetic tape 6 in the running state, and reversing the transportation direction of the magnetic tape 6, the head displacing portion 7 vibrates the magnetic head 1 under the control by the displacement control portion 14. As a result, static friction between the magnetic head 1 and the magnetic tape 6 does not occur, and thus the risk of damage to the magnetic head 1 (such as an MR head unit 1a equipped with an MR element) or the magnetic tape 6 can be decreased.

Furthermore, at the time of reversing the transportation direction of the magnetic tape 6, the head displacing portion 7 vibrates the magnetic tape 6 under the control by the displacement control portion 14. As a result, static friction between the magnetic tape 6 and the magnetic head 1 does not occur, and thus, the risk of damage to the magnetic head 1 or the magnetic tape 6 can be decreased.

In particular, in a case where the spacing between the magnetic head and the magnetic tape is deceased in order to realize a high-density recording on the magnetic tape, since the magnetic tape will be smoothed to have a surface smoothness Ra of 3.0 nm or less, sticking between the magnetic tape and the magnetic head may occur at the time of starting and/or stopping transportation of the magnetic tape 6. When such a sticking occurs, the magnetic tape may break, or either the magnetic tape or the magnetic head may be flawed. In the present embodiment, the magnetic head 1 is vibrated at the time of starting and/or stopping transportation of the magnetic tape 6 so as to decrease the static friction between the magnetic head 1 and the magnetic tape 6. Thereby, even if the surface of the magnetic tape 6 is smoothed, sticking between the magnetic tape 6 and the magnetic head 1 can be decreased, and thus breakage of the magnetic tape 6 and flaws on the magnetic tape 6 or the magnetic head 1 can be prevented.

Further, since the head displacing portion 7 is configured to also serve as a voice coil that moves the magnetic head 1 in the width direction of the magnetic tape 6 for performing a tracking servo, there is no necessity of providing a separate member for vibrating the magnetic head 1. As a result, the cost and the size of the magnetic tape driving apparatus can be decreased. Namely, the "head displacing portion 7" in the present embodiment includes a structure for moving the magnetic head 1 in the width direction of the magnetic tape 6 in order to perform a tracking servo and a structure for vibrating the magnetic head 1.

The present embodiment refers to the operation at the time of transporting the magnetic tape 6 in the direction indicated with the arrow A in FIG. 1 for explanation of a recording operation with reference to FIG. 3A and FIG. 4A. The operation at the time of transporting the magnetic tape 6 in the direction indicated with the arrow B can be controlled similarly. Further, the operation at the time of reproducing data recorded on the magnetic tape 6 can be performed in the similar manner.

In the present embodiment, in the recording operation as shown in FIG. 3A, after inputting the instruction for stopping the transportation of the magnetic tape 6 (step S8), vibration of the magnetic head 1 is started (step S9), and the magnetic tape 6 is decelerated (step S10). In an alternative configuration, after inputting the instruction for stopping the transportation of the magnetic tape 6, the magnetic tape 6 is decelerated, and then the vibration of the magnetic head 1 is started before the magnetic tape 6 stops. In a further alternative configuration, the control portion 12 detects the torque currents of the motors 21 and 22 and monitors the transportation speed of the magnetic tape 6, and when the transportation speed of the magnetic tape 6 is decreased to a predetermined speed, the control portion 12 controls to start vibration of the magnetic head 1.

In the present embodiment, the timing to stop the vibration of the magnetic head 1 is set to follow stabilization of the transportation speed of the magnetic tape 6. In an alternative configuration, the vibration of the magnetic head 1 may be stopped at the time that a predetermined time has passed from the start of transportation of the magnetic tape 6 (for example, one second from the timing T3 in FIG. 4A). This configuration can be realized by providing a timer to the control portion 12 so as to clock from the start of transportation of the magnetic tape 6.

Further, in the present embodiment, the timing for stopping the vibration of the magnetic tape 5 is set to follow the stabilization of the transportation speed of the magnetic tape 6. In an alternative configuration, the vibration of the magnetic head 1 may be stopped at the time that the transportation speed of the magnetic tape 6 reaches a predetermined speed (for example, 3 m/sec.). This configuration can be realized by calculating the transportation speed of the magnetic tape 6 on the basis of the torque currents of the motors 21 and 22 at the control portion 12, and comparing the speed with the predetermined speed (for example, 3 m/sec.).

JP 2008-287850 A is a document aiming to decrease static friction between the magnetic tape and the magnetic head at the time of starting transportation, stopping transportation and reversing the transportation direction of a magnetic tape.

In comparison with the configuration as disclosed in JP 2008-287850 A that serves to decrease the static friction between the magnetic tape and the magnetic head so as to prevent damage to the magnetic tape for example, the present embodiment provides a characteristic advantage that the configuration for decreasing the static friction between the magnetic tape and the magnetic head can be realized with a decreased number of components and at a lower cost. Namely, the magnetic tape driving apparatus according to the present embodiment inherently has a member (head displacing portion 7) for moving the magnetic head in the width direction of the magnetic tape for the purpose of performing a tracking servo, and vibrates the magnetic head by use of the member. Therefore, there is no necessity of packaging a special mechanism for vibrating the magnetic head, thereby both the number of components and the cost can be reduced.

The magnetic head 1 in the present embodiment is an example of a magnetic head unit of the present application. Each of the motors 21 and 22 in the present embodiment is an example of a tape transporting portion of the present application. Each of the head displacing portion 7 and the displacement control portion 14 is an example of a head displacing portion of the present application. The member for moving the magnetic head 1 in the width direction of the magnetic tape 6 in order to execute the tracking servo is included in the head displacing portion of the present application.

EXAMPLES

Hereinafter, the present embodiment will be described in more detail with reference to Examples. The inventors used an LTO4 drive manufactured by Hewlett Packard Company so as to reciprocate a prototype tape in conformity with the LTO standards between the BOT portion and the EOT portion repeatedly. At the time of starting transportation, stopping transportation and reversing the transportation direction, in accordance with the condition as mentioned in Table 1, a current of a predetermined frequency is applied to the voice coil as a member for displacing the magnetic head thereby vibrating the magnetic head. Based on the above-mentioned operation condition, the magnetic tape was run repeatedly 10000 passes at ordinary temperature and ordinary humidity for the purpose of running test, and the following evaluation results were obtained.

<Sticking Between Magnetic Head and Magnetic Tape>

The inventors monitored the driving current of the voice coil conveying the magnetic tape, and regarded that "sticking occurred between the magnetic head and the magnetic tape" when the driving current exceeded a predetermined current value. In the Table 1 below, "Good" denotes a case where no sticking occurred between the magnetic head and the magnetic tape during running of the magnetic tape for 10000 passes. "Passable" denotes a case where the number of sticking between the magnetic head and the magnetic tape was from 1 to 5. And "Bad" denotes a case where the number of sticking between the magnetic head and the magnetic tape was more than 5.

<Tape Edge Flaws>

The inventors observed the tape edges at the returning point in the repeated running of the magnetic tape with an optical microscope at ×200. "Good" denotes a case where substantially no flaws were found at the tape edges. "Passable" denotes a case where slight flaws were found at the tape edges. And "Bad" denotes a case where quite large flaws were found at the tape edges.

Table 1 shows the evaluation result of the magnetic tape after running. In Table 1, Comparative Example 1 indicates an evaluation result for a case where the magnetic tape was run repeatedly without vibrating the magnetic head.

TABLE 1

|  | | Ex. 1 | Ex. 2 | Ex. 3 | Ex. 4 | Ex. 5 | Ex. 6 | Ex. 7 | Com. 1 | Ref. 1 | Ref. 2 |
|---|---|---|---|---|---|---|---|---|---|---|---|
| Head | Freq. (Hz) | 10 | 10 | 10 | 10 | 100 | 500 | 900 | — | 5 | 10 |
|  | Amp. (μm) | 0.1 | 1 | 50 | 150 | 1 | 1 | 1 | — | 1 | 200 |
| Tape | Amp. (μm) | 0 | 0 | 6.1 | 24.4 | 0 | 0 | 0 | 0 | 0.7 | 36.6 |
| Sticking | | Good | Good | Good | Good | Good | Good | Good | Bad | Passable | Good |
| Tape edge flaw | | Good | Good | Good | Good | Good | Good | Good | Good | Good | Passable |

As clearly shown in Table 1, Examples 1-7 and Reference Examples 1, 2 are preferable or comparatively preferable in terms of the sticking between the magnetic head and the magnetic tape, and in terms of the tape edge flaws. However, in Comparative Example 1, since the magnetic head is not vibrated, the static friction between the magnetic head and the magnetic tape was great, and the sticking between the magnetic head and the magnetic tape was considerable. In the Reference Example 1 where the frequency for vibrating the magnetic head was comparatively small, the effect of avoiding static friction was insufficient, and the magnetic tape had a propensity to stick to the magnetic head. In the Reference Example 2 where the amplitude of vibration was comparatively large, a phenomenon that the edge of the magnetic tape got contact with the regulating portion of the tape guide member occurred. As a result, a slight tape edge flaws were observed.

The magnetic tape driving apparatus disclosed in the present application is used preferably as an apparatus that uses a magnetic tape as an information medium. In particular, the magnetic tape driving apparatus disclosed in the present application is used preferably as a magnetic tape driving apparatus capable of linear recording of data on a computer tape.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic tape driving apparatus comprising:
   a magnetic head unit comprising a magnetic head capable of recording or reproducing information by sliding to contact with a magnetic tape; and
   a tape transporting portion for transporting the magnetic tape,
   the magnetic tape driving apparatus further comprising a head displacing portion for displacing the magnetic head unit in the width direction of the magnetic tape and tracking the magnetic head to an arbitrary track among a plurality of tracks formed on the magnetic tape, and
   when the tape transporting portion starts transportation of the magnetic tape in a stopped state and/or when the tape transporting portion stops the magnetic tape in a running state, the head displacing portion vibrates the magnetic head unit in the tape width direction; and
   wherein a vibration frequency of the magnetic head unit in a vibration mode is not less than 10 Hz and less than 1 kHz.

2. The magnetic tape driving apparatus according to claim 1,
   wherein when the magnetic tape transporting portion reverses the transportation direction of the magnetic tape, the head displacing portion vibrates the magnetic head unit in the tape width direction from a moment before stopping the magnetic tape running in a first direction to a moment after starting transportation of the tape in a second direction different from the first direction.

3. A method of driving a magnetic tape, comprising:
   vibrating a magnetic head unit in the width direction of a magnetic tape, following an input of instruction for starting transportation of the magnetic tape;
   starting transportation of the magnetic tape after the magnetic head unit starts vibrating in the tape width direction; and
   stopping the vibration of the magnetic head unit after the magnetic tape starts running; and
   wherein a vibration frequency of the magnetic head unit in a vibration mode is not less than 10 Hz and less than 1 kHz.

4. A method of driving a magnetic tape, comprising:
   vibrating a magnetic head unit in the width direction of a magnetic tape, following an input of instruction for stopping transportation of the magnetic tape in a state where the magnetic tape is running;
   stopping transportation of the magnetic tape after the magnetic head unit starts vibration; and
   stopping vibration of the magnetic head unit after the magnetic tape stops running; and
   wherein a vibration frequency of the magnetic head unit in a vibration mode is not less than 10 Hz and less than 1 kHz.

5. A method of driving a magnetic tape, comprising:
   vibrating a magnetic head unit in the width direction of a magnetic tape, following an input of instruction for reversing a transportation direction of the magnetic tape in a state where the magnetic tape is running in a first direction;
   stopping transportation of the magnetic tape after the magnetic head unit starts vibration;
   starting transportation of the magnetic tape in a second direction different from the first direction after the magnetic tape stops running; and
   stopping vibration of the magnetic head unit after the magnetic tape starts running in the second direction; and
   wherein a vibration frequency of the magnetic head unit in a vibration mode is not less than 10 Hz and less than 1 kHz.

* * * * *